April 26, 1960   M. A. MOSKOVITZ   2,934,365
BALL JOINT ASSEMBLY
Original Filed Nov. 29, 1955
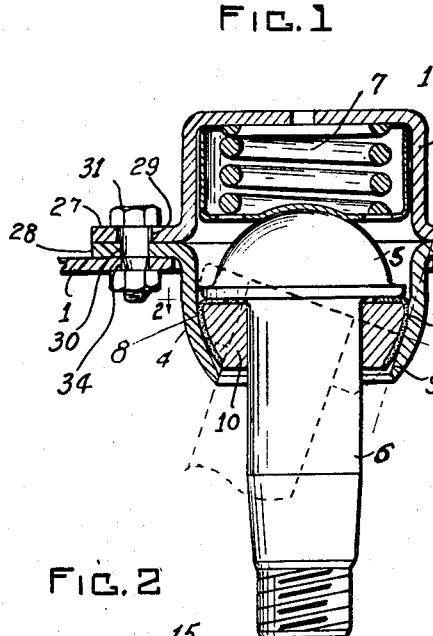
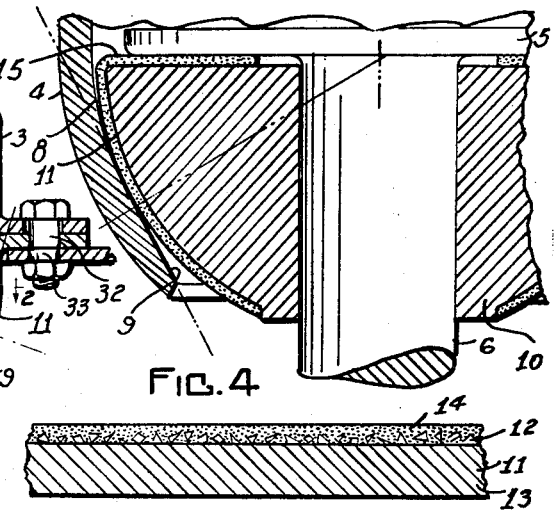
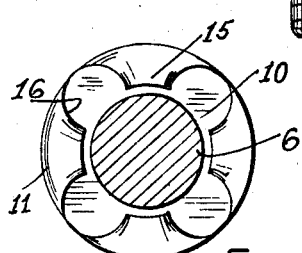
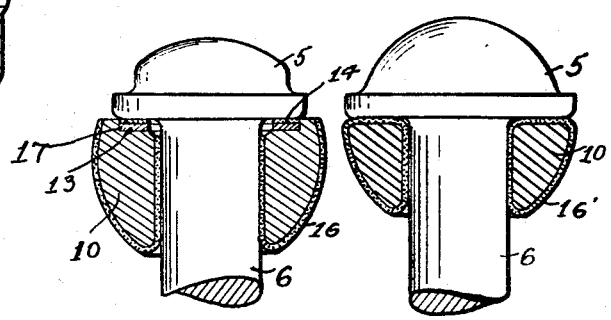
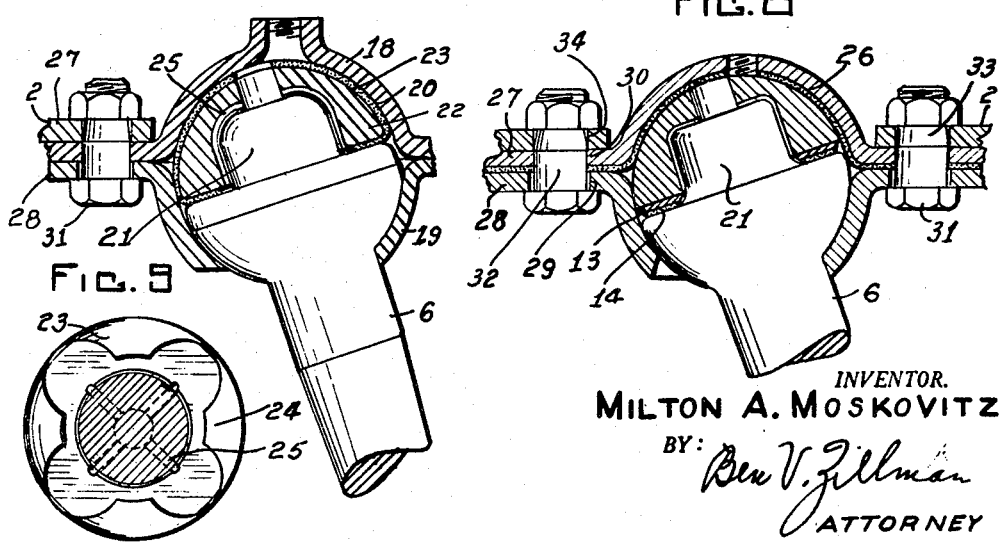
INVENTOR.
MILTON A. MOSKOVITZ
BY: Ben V. Zillman
ATTORNEY United States Patent Office 2,934,365
Patented Apr. 26, 1960

2,934,365

BALL JOINT ASSEMBLY

Milton A. Moskovitz, Richmond Heights, Mo., assignor of one-half to Harry Frankel, St. Louis, Mo.

Original application November 29, 1955, Serial No. 549,693, now Patent No. 2,885,235, dated May 5, 1959. Divided and this application March 4, 1959, Serial No. 797,246

5 Claims. (Cl. 287—90)

This invention relates to a ball joint assembly of the type that is especially adapted for interconnecting relatively movable parts of a motor vehicle, as for instance in a part of the steering mechanism or the wheel suspension of the same.

The current trend in motor vehicle design is to so reduce the number of grease fittings to a minimum so that necessity for replacement of lubricant to the same is obviated, and the principal object of this invention is to so construct a joint of the kind described that it requires no lubricant replacement, or perhaps at only rare and infrequent intervals, and which is substantially permanently initially assembled as a completed unit ready for installation substantially as is.

One of the more important objects of my invention is to so construct such a joint that its bearing will employ a sheath that is made of various materials permanently associated with each other, one of the component materials being a plastic that has a rather poor mechanical strength and an extremely low coefficient of friction, and backing this weak material with an extremely sturdy metal that is well able to withstand hard usage, thereby combining utmost ease of steering with safety.

Another object of the invention is to so construct such a bearing sheath that it may be easily and securely interlocked with the suitable base or core on which it is mounted.

A further object of my invention is to provide a bearing unit of the kind described, with initially formed spaced-apart ears thereon that are then bent into superimposement on the base element or core, such as a bushing, to securely interlock with the latter, and shaping said ears so that they have arcuate bounding walls to provide pockets between said ears to entrap lubricant and cause the lubricant to swirl about as relative movement occurs between the adjacent cooperating members.

An added object of the invention is to provide novel means of interconnection between the casing parts of the joint, completing this connection at initial assembly of the joint, to thereby not only hold the joint parts together in assembled relationship, but permit of easy and certain centering of the joint on the cooperating supporting member with which it is to be associated, such as the plate or control arm of the vehicle.

Many other objects and advantages of the construction herein shown and described, and the uses and advantages obtained thereby, will be obvious to those skilled in the art to which this invention appertains as will be apparent from the disclosures hereinafter given.

To this end, my invention consists in the novel form, arrangement, construction and combination herein shown and described, and as will be more clearly pointed out in the claims hereinafter appended.

In the drawings, wherein like or corresponding parts are indicated by like reference characters throughout the views, Figure 1 is a vertical cross-sectional view through a joint, showing a fragment of the control arm to which it is connected;

Figure 2 is a horizontal cross-section taken through the same, substantially along the line 2—2 of Fig. 1;

Figure 3 is an enlarged detail showing the bearing relation between the relatively movable elements, as initially assembled;

Figure 4 is a highly magnified detail through the thickness of the composite bearing element shown in Figs. 1–9 inclusive;

Figures 5 and 6 are details of modified forms of joints, with the casing parts omitted;

Figures 7 and 8 are cross-sectional views of additional forms of joints; and

Figure 9 is a plan view of the bushing shown in Fig. 7, having its sheath secured thereto, as viewed from the planar end of the bushing.

This application is a divisional application of my co-pending Serial No. 549,693 filed November 29, 1955, now Patent No. 2,885,235.

Referring more particularly to the drawings, wherein I have illustrated the preferred embodiments of my invention, there are shown ball and socket type joints especially intended for interconnection between the front wheel steering knuckle and the control arm of the vehicle, the joints shown in Figs. 1–6 inclusive interconnecting with the upper control arm 1 for stabilizing the upper end of the steering knuckle, while the joints shown in Figs. 7–9 inclusive are intended for interconnecting the knuckle and the lower control arm 2 of the vehicle, these joints being initially completely assembled prior to their installation on the vehicle and requiring no disturbing of said assembled relationship when installing them on the vehicle.

In the forms shown in Figs. 1–6 inclusive there is a housing or casing composed of a pair of opposed hollow mating shells 3 and 4 to together provide a chamber therebetween open at one end, as for instance at the lower end, in the form shown.

A steel stud, provided with a rounded or convex radially enlarged head 5 and an axially extending shank 6 is rotatably and tiltably movable in said casing, with said shank projecting outwardly through the open end of the casing, and suitable resiliently yieldable pressure means 7 is mounted within said casing so as to constantly urge said stud outwardly through said casing.

The lower shell 4 is formed with an internal concave bearing surface 8 therein, but it is to be particularly noted that this spherically rounded portion terminates at a point that is spaced axially inwardly or rearwardly of said open end of the casing, and from that point outwardly to said open end the chamber bounding wall continues as a flared or tapered conical surface 9, with the angle of taper being substantially tangent to the concave bearing surface as indicated in dotted lines in Figs. 1 and 3.

A bushing is interposed between the stud and the shell bearing surface to engage the latter as relative movement occurs between the parts, and in the forms shown in Figs. 1–6 inclusive, the bushing is bored to receive the stud shank and has a convex exterior that is approximately concentric to the concave bearing surface of the casing.

As a great deal of friction between the movable parts is apt to occur during service, I have so combined material of various characteristics to make for a minimum of friction between the actual bearing surfaces of the joint and yet secure the requisite mechanical strength.

Therefore, only the core 10 of the bushing is made of a strong and sturdy material, such as steel, that is well able to withstand shocks and the load and to rapidly dissipate heat from the cooperating bearing parts, the convex exterior of this core being of such size and shape and of sufficiently small radius to be spaced from the opposed concave bearing surface of the casing, the top of this core being substantially planar, and in the forms shown in Figs. 1–4 said planar face is spaced from the correspondingly planar face of the under side of the stud head.

An anti-friction sheath 11 is interposed between the rounded face of said bushing core and the opposed bearing surface of the casing, and is secured to said core so as to have its exterior face slidably engage said casing bearing face.

This exterior surface of the sheath is made of a material that has an extremely low coefficient of friction, as for example, of a plastic or plastic-impregnated material such as nylon, polytetrafluorethylene or fluorocarbon resin, etc.

Inasmuch as this resin by itself is limited in its use as an anti-friction material, to light loads and at low speeds due to its poor thermal conductivity, poor temperature stability as compared with metals, high coefficient of thermal expansion, tendency to flow and its elastic memory, I have combined this resin physically with other material into a composite integral unit sheath that will carry off the heat generated during operating service and provide support and will give dimensional stability that the resin lacks in itself.

I therefore make the composite sheath by applying a matrix or layer of a substantially porous material such as bronze powder 12 to the surface of a steel backing sheet 13, then sintering said powder in a reducing atmosphere to bond it to said backing sheet. The porous bronze surface of the resultant bi-metallic strip is then impregnated with the fluorocarbon resin to fill the void of the bronze and mechanically interlock said matrix and preferably project sufficiently above the latter to provide a thin layer of the pure resin.

Although the sheath thus produced could be used dry, it is preferable that liquid lubricant be used in most cases, as this increases the rate of heat dissipation and permits of more severe operating conditions. The matrix is only a few thousandths of an inch thick, and the resin is not much thicker, projecting only a few thousandths of an inch therebeyond, while the steel backing is many times thicker than the combined thicknesses of the bronze and resin, say at least 1/16", to afford proper strength to the sheath.

The composite sheath thus produced, although it may be initially flat, may be subsequently shaped as required, and in Figs. 1–3 is shown wrapped about the convex exterior of the bushing core to tightly hug the same, its upper end having circumferentially spaced-apart upstanding ears 15 with arcuate bounding edges therebetween, so that the ears may be bent flat onto the planar end of the bushing core and extend to adjacent the stud shank (as shown in Fig. 2).

Now, when relative rotation occurs between the stud and the bushing as thus sheathed, the approximately circular pockets between said adjacent ears will cause the lubricant entrapped therein to swirl and propel said lubricant toward the shank and along the opposed under face of the stud.

In the form shown in Figs. 1–6 inclusive, it is preferable that the bushing and tangential surface of the chamber have such a relative association that when the stud has been moved to its limit of tilt in one direction, as indicated in dotted lines in Fig. 1, and with the one side of the bushing tilted upwardly, the opposed convex face of the bushing sheath will bear on the chamber wall at approximately the innermost beginning of tangency or flare.

In Figs. 5 and 6, the sheath 16 and 16' respectively, envelopes the shank receiving portion of the core as well as being superimposed to cover the convex exterior of the latter, thus reducing wear of the shank, said sheath 16' completely enclosing said core.

In addition, a separate sheath, in the form of a ring or washer 17 having the relatively thin plastic coating on a relatively thicker steel backing strip, as previously described, may be interposed between said core and under side or radial flange of the stud head, as indicated in Fig. 5, so that said resin face will be complemental to the planar face of said stud head with a minimum of friction therebetween, while the steel face will be rotatable on said core, whereby the greater frictional contact between said core and ring will permit easy rotation between the stud and bushing, and with a tendency of the ring to rotate with the bushing.

In the modification shown in Fig. 7, the hollow casing comprises a pair of hollow chambered mating shells 18—19 having a substantially spherical inner wall, one of the shells provided with a concave bearing surface 20 to engagingly cooperate with the sheathed bushing. Here, the stud has an axially projecting portion 21, extending beyond the stud head in a direction opposite to that of the shank, such projecting portion receiving the bored bushing core 22 rotatably thereon.

A sheath 23 made as previously described, is wrapped onto said convex core of the bushing to be approximately complemental to said bearing surface 20, said sheath preferably having the upstanding circumferentially spaced-apart ears 24 with arcuately shaped openings therebetween to form the lubricant-holding pockets after said ears are bent down into superimposement with the planar end of the core (see Figs. 7 and 9). If desired, additional lubricant passages 25 may be provided in the bushing to permit ready travel of lubricant therealong as indicated.

In the modification shown in Fig. 8, the stud is substantially like that shown in Fig. 7, and the bushing core is unsheathed, but instead, a sheath 26 is secured to the concave wall of one of the casing shells to form a liner, and in this case a ring or washer substantially like that shown in Fig. 5 and for a like purpose, is interposed between the planar ends of the bushing and the stud head, so that here too, there is more tendency for the washer to rotate with the bushing than with the stud.

The casing sections are interlocked to hold them together as a complete unit with the movable parts contained therein, thereby permitting such a unit to be handled without likelihood of any loss of parts or of displacement of desired relationship, holding said unitary assemblage during installation onto the control arm or the like.

The casing shells are provided with opposed radially extending flanges 27—28. Bolt holes 29 are provided through one of the pair of mating flanges and registering bolt holes 30 are provided through the other of said pair of flanges, but the holes in one flange, as at 29 being of larger diameter than the holes 29. A bolt having a radially enlarged head 31, a shank 32 and a decreasingly tapered tip 33 is passed through each pair of said registered holes, the shank being of such size as to pass easily through the holes 29, but requiring being driven through the holes 30 to force-fit within the latter, the length of said shank 32 being approximately equal to the combined axial length of the holes 29 and 30 constituting the pair. Thus, the joint unit is positively maintained in its initially assembled relationship as soon as said bolts have been driven into place.

To install the unit on the control arm, the tapered tips of the bolts will pass readily through bolt holes 34 of said arm, as said holes are approximately of the same size as the holes 30, and the largest diameter of the shank will substantially fill the hole 34.

I claim:

1. In a ball and socket type joint, a casing provided with a socket having a concave bearing surface, a steel stud rotatably and tiltably mounted in said socket with its head therein and with its shank projecting axially outwardly therefrom, a bushing encircling said stud and tiltable and rotatable in said socket and provided with a convex ferrous surface opposed to said concave surface and spaced therefrom, and a plastic-faced sheath rigidly fixed to one of said opposed surfaces to substantially fill the space therebetween and tiltably engage said other opposed surface and having an extremely low coefficient of friction as compared with that of said last-mentioned of the opposed bearing surfaces, to thereby provide an anti-friction bearing at its face that slidably engages said last-mentioned of the opposed bearing surfaces.

2. A ball and socket type joint of the kind set forth in claim 1, further characterized in that said sheath comprises a base sheet of steel, a porous metal coating on one face of said sheet, and an antifriction plastic layer bonded to said porous metal to fill the voids in the latter and being of a thickness to extend outwardly beyond the latter to provide a homogeneous face portion to engage the cooperating face of the other of the pair of opposed surfaces.

3. A joint as set forth in claim 2, further characterized in that said porous metal and the plastic are relatively softer than said base sheet and are together of less thickness than the latter.

4. A joint of the kind set forth in claim 1, further characterized in that the bushing has a planar end portion parallel and opposed to the stud head, and the sheath has an end permanently deformed and bent radially inwardly to lie in superimposement on said bushing for bearing engagement with the stud head.

5. A joint as set forth in claim 4, further characterized in that said bent end of the sheath has circumferentially spaced-apart ears having arcuate bounding edges therebetween, so that lubricant-receiving pockets are formed between said ears to swirl the lubricant as relative rotational movement occurs between said stud and bushing.

References Cited in the file of this patent

UNITED STATES PATENTS 2,274,420     Katcher ---------------- Feb. 24, 1942